US010005137B2

(12) United States Patent
Lee

(10) Patent No.: US 10,005,137 B2
(45) Date of Patent: Jun. 26, 2018

(54) CUTTING TOOL

(71) Applicant: y. g-1 Tool Co., Yeonsu-gu, Incheon (KR)

(72) Inventor: Young Bae Lee, Kyeongki-do (KR)

(73) Assignee: Y. G-1 TOOL. CO., Incheon (KR)

( * ) Notice: Subject to any disclaimer, the term of this patent is extended or adjusted under 35 U.S.C. 154(b) by 118 days.

(21) Appl. No.: 14/920,196

(22) Filed: Oct. 22, 2015

(65) Prior Publication Data
US 2017/0113284 A1 Apr. 27, 2017

(51) Int. Cl.
B23B 51/02 (2006.01)
B23B 51/04 (2006.01)

(52) U.S. Cl.
CPC ............ *B23B 51/048* (2013.01); *B23B 51/02* (2013.01); *B23B 2251/087* (2013.01); *B23B 2251/14* (2013.01); *B23B 2251/18* (2013.01); *B23B 2251/50* (2013.01)

(58) Field of Classification Search
CPC ............ B23B 2251/18; B23B 2251/14; B23B 2251/087; B23B 51/02
See application file for complete search history.

(56) References Cited

U.S. PATENT DOCUMENTS

| 1,407,546 | A | * | 2/1922 | Joseph | .................... B23B 51/02 408/223 |
| 3,991,454 | A | * | 11/1976 | Wale | ........................ B23B 51/02 407/56 |
| 4,215,955 | A | | 8/1980 | Lillie | |
| 4,420,050 | A | | 12/1983 | Jones | |
| 4,802,799 | A | * | 2/1989 | Rachev | ................... B23B 51/02 407/100 |
| 5,160,232 | A | * | 11/1992 | Maier | ..................... B23B 51/02 407/54 |
| 5,172,778 | A | | 12/1992 | Tibbitts et al. | |
| 5,791,424 | A | | 8/1998 | Moser et al. | |
| 5,862,873 | A | | 1/1999 | Matthias et al. | |
| 5,947,660 | A | | 9/1999 | Karlsson et al. | |
| 6,206,116 | B1 | | 3/2001 | Saxman | |
| 6,227,319 | B1 | | 8/2001 | Radford | |
| 6,273,651 | B1 | | 8/2001 | Heinloth et al. | |

(Continued)

FOREIGN PATENT DOCUMENTS

| DE | 4435857 A1 | * | 4/1996 | ............. B23B 51/00 |
| DE | 102006025294 A1 | * | 12/2007 | ............. B23B 51/02 |

(Continued)

OTHER PUBLICATIONS

Daniel B. Dallas, Tool and Manufacturing Engineers Handbook: A Reference Work for Manufacturing Engineers, Third Edition, Society of Manufacturing Engineers, published by McGraw-Hill Book Company.

(Continued)

*Primary Examiner* — Ryan Rufo
(74) *Attorney, Agent, or Firm* — Vedder Price, P.C.

(57) ABSTRACT

The present disclosure relates to cutting tools and cutting inserts in general, and more particularly to the specific shapes of cutting edges on cutting tools and cutting inserts. In an embodiment, a cutting tool with a cutting edge formed as a sinusoidal curve is provided. In an embodiment, a rotary drill bit including a cutting insert comprising a sinusoidal curve is provided.

7 Claims, 8 Drawing Sheets

(56) References Cited

U.S. PATENT DOCUMENTS

| | | | |
|---|---|---|---|
| 6,309,149 B1 * | 10/2001 | Borschert | B23B 51/02 408/1 R |
| 6,371,702 B1 * | 4/2002 | DeWald, Jr. | B23B 51/0009 408/227 |
| 6,374,932 B1 | 4/2002 | Brady | |
| 6,415,687 B2 | 7/2002 | Saxman | |
| 6,443,674 B1 * | 9/2002 | Jaconi | B23B 51/02 408/1 R |
| 6,454,029 B1 | 9/2002 | Loots et al. | |
| 7,311,480 B2 | 12/2007 | Heule et al. | |
| 7,549,490 B2 | 6/2009 | McDonough et al. | |
| 8,690,494 B2 | 4/2014 | Fang et al. | |
| 8,960,336 B2 | 2/2015 | Kersten et al. | |
| 9,085,947 B2 | 7/2015 | George et al. | |
| 2001/0031182 A1 * | 10/2001 | Widin | B23B 51/02 408/230 |
| 2002/0098050 A1 * | 7/2002 | Heule | B23B 51/0009 408/227 |
| 2002/0141839 A1 * | 10/2002 | McKinley | B23B 51/0009 408/224 |
| 2003/0039522 A1 * | 2/2003 | Yanagida | B23B 51/02 408/230 |
| 2003/0053873 A1 * | 3/2003 | Shaffer | B23B 51/02 408/230 |
| 2004/0175245 A1 * | 9/2004 | Takiguchi | B23B 51/0009 408/230 |
| 2005/0249562 A1 * | 11/2005 | Frejd | B23B 51/02 408/230 |
| 2007/0036622 A1 | 2/2007 | Lee | |
| 2007/0215388 A1 | 9/2007 | Kirk et al. | |
| 2014/0169893 A1 | 6/2014 | Fang et al. | |
| 2014/0318870 A1 | 10/2014 | George et al. | |

FOREIGN PATENT DOCUMENTS

| | | |
|---|---|---|
| WO | 2013022555 | 2/2013 |
| WO | 2014116517 | 8/2014 |

OTHER PUBLICATIONS

Metal Cutting Tool Handbook, Sixth Edition (1969), published by Metal Cutting Tool Institute, New York, NY.

* cited by examiner

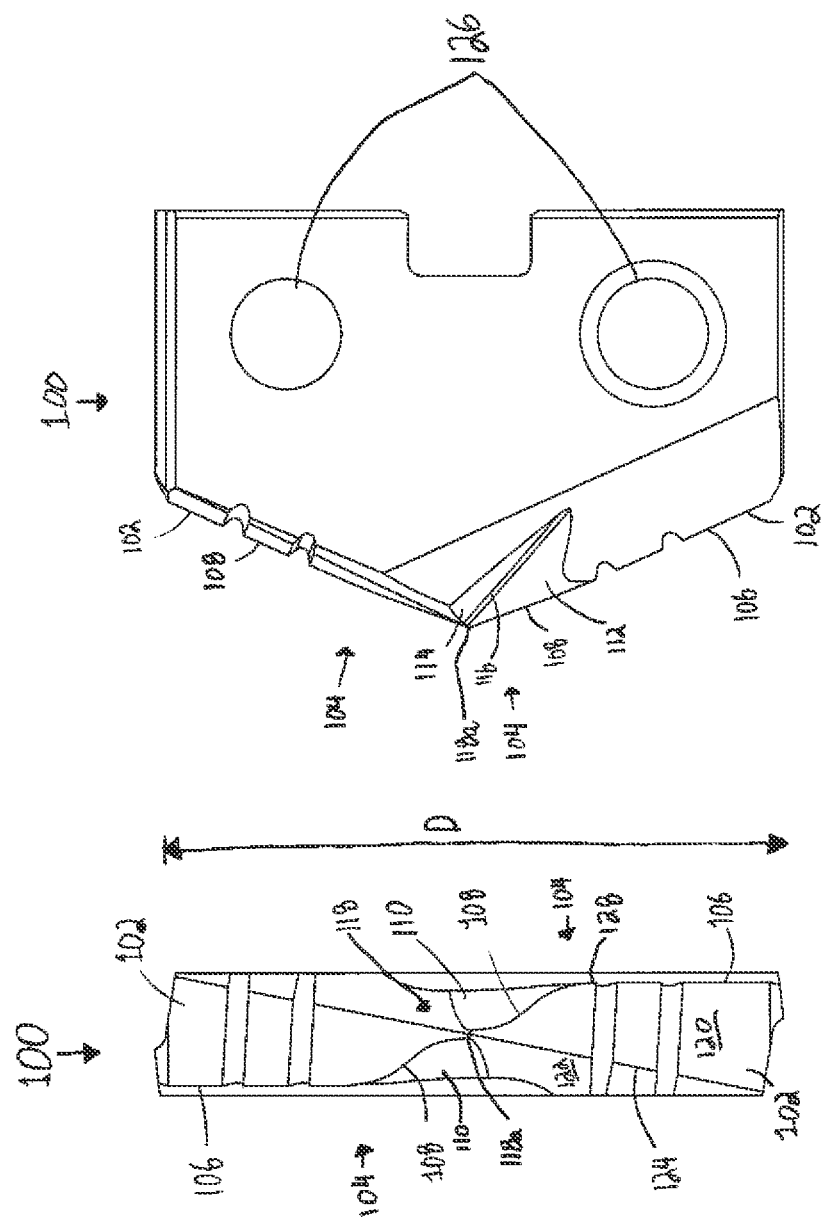

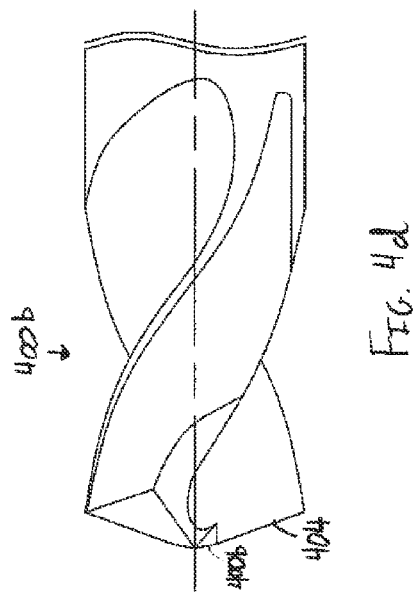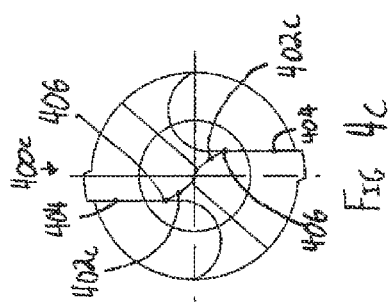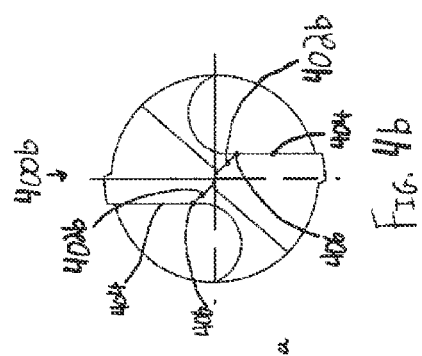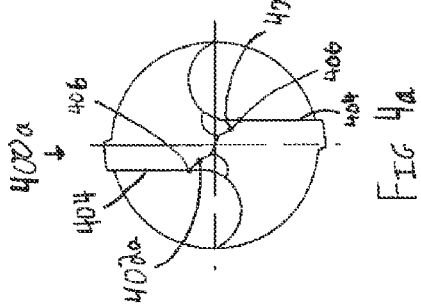

CUTTING TOOL

FIELD OF THE DISCLOSURE

The present disclosure generally relates to cutting tools, and more particularly, to drills, drill bits, and cutting inserts.

BACKGROUND

Rotary cutting tools are used to machine on workpieces. In particular, rotary cutting tools may be used to remove material from a workpiece, so as to form a workpiece to a desired size or shape or create particular features on the face of a workpiece. Generally, a rotary cutting tool is turned around its longitudinal axis while one or more cutting edges on the cutting tool are brought into contact with a workpiece so as to remove material from the workpiece. Rotary cutting tools include mill cutters such as end mill cutters and ball nose cutters, which are used in milling machines to form features such as slots, keyways, and pockets on a workpiece. Other types of cutting tools include drills, which may be used to form cylindrical holes in a workpiece, as well as mill drills, which may be used similarly to a milling machine.

The performance of a cutting tool is dependent upon the quality of its one or more cutting edges. Over time and as a result of prolonged use, the one or more cutting edges of a cutting tool may become dull as a result of prolonged physical contact between the cutting tool and workpieces. Cutting tools generally remove material from a workpiece through abrasion; the friction caused by this repeated rough contact may slowly wear away or dull the cutting tool.

As a result, cutting tools typically last for limited amounts of time before requiring replacement. The operational life of a cutting tool may be extended by employing replaceable cutting edges (for example, in the form of replaceable cutting inserts or drill bits), which allow the life of the cutting tool itself to be prolonged by using new cutting edges.

Replaceable drill bit inserts or cutting inserts are well known in the art. By way of example, U.S. Pat. No. 9,085,947 to George et al. discloses a rotary drill bit for engaging an earth strata material featuring a removable cutting insert. Similarly, U.S. Pat. No. 7,311,480 to Heule et al. discloses a drilling tool cutting insert adapted to be clamped in a rotatably driven drilling tool base body. U.S. Patent Publication No. 2007/0036622 provides a removable spade drill insert. The contents of these references are incorporated herein by reference in their entireties.

However, the one or more cutting edges on the drill bit or cutting insert wear down over time, requiring that the drill bit or cutting insert be replaced. This necessitates ongoing costs associated with purchasing and storing replacement parts as well as the logistical overhead required to manage the replacement parts. Further, time is lost each time a cutting tool needs to be shut down, either to replace the tool itself or merely the cutting edges which have degraded.

Accordingly, there is still a need for improved cutting tools in general, and more particularly for improved cutting edges, drill bits, and cutting inserts, that overcome the disadvantages, limitations, and shortcomings of known devices. For example, it is desirable to provide an improved cutting tool that provides a longer useful life. It is also desirable to provide an improved cutting tool that is less susceptible to catastrophic failure and has improved performance characteristics, including, for example, an increased penetration rate.

SUMMARY

An embodiment of the present invention provides a drill insert comprising: a pair of cutting webs inclined relative to each other; a pair of transversely opposed cutting portions, each cutting portion partially defining a side portion of a corresponding cutting web, each cutting portion comprising: an outer cutting edge; an inner cutting edge connected to the outer cutting edge at a transition point; and wherein the inner cutting edge of each cutting portion converge at a point region and each inner cutting edge is sinusoidal in shape.

Another embodiment provides a chisel portion for a drill comprising: a centrally disposed point region centered; a pair of cutting edges transversely opposed relative to the point region, each cutting edge comprising an inner cutting edge adjacent to the point region and an outer cutting edge connected to the inner cutting edge; wherein each inner cutting edge is sinusoidal in shape.

Another embodiment provides a drill bit comprising: a drill body having a rotational axis running longitudinally through a forward end and a rear end; a pair of cutting webs located at the forward end inclined relative to each other; a pair of transversely opposed cutting portions, each cutting portion partially defining a side portion of a corresponding cutting web, each cutting portion comprising: an outer cutting edge; an inner cutting edge connected to the outer cutting edge at a transition point; and a notch having a first face, a curved second face and a curved valley, the curved valley connecting the first face and the second face, the first face bound by the curved valley and the inner cutting edge; and a chisel defined by the first face, the valley, the second face and the inner cutting edge of each cutting portion and the cutting webs converging to a point region; wherein each inner cutting edge is sinusoidal in shape.

BRIEF DESCRIPTION OF THE DRAWINGS

The following disclosure as a whole may be best understood by reference to the provided detailed description when read in conjunction with the accompanying drawings, drawing descriptions, abstract, background, field of the disclosure, and associated headings. Identical reference numerals, when found on different figures, identify the same elements or functionally equivalent elements. The elements listed in the abstract are not referenced but nevertheless refer by association to the elements of the detailed description and associated disclosure.

FIG. 1a is a top elevation view of a cutting insert in accordance with an embodiment of the present disclosure;

FIG. 1b is a side elevation view of the cutting insert of FIG. 1a;

FIG. 2b is a side elevation view of the cutting tool of FIG. 2a;

FIG. 4a is a top elevation view of a cutting tool featuring a constant-radius curve on the secondary cutting lips;

FIG. 4b is a top elevation view of a cutting tool featuring linear secondary cutting lips;

FIG. 4c is a top elevation view of a cutting tool featuring a constant, convex radius curve on the secondary cutting lips;

FIG. 4d is a side elevation view of the cutting insert of FIG. 4b;

DETAILED DESCRIPTION

Figure 2B:
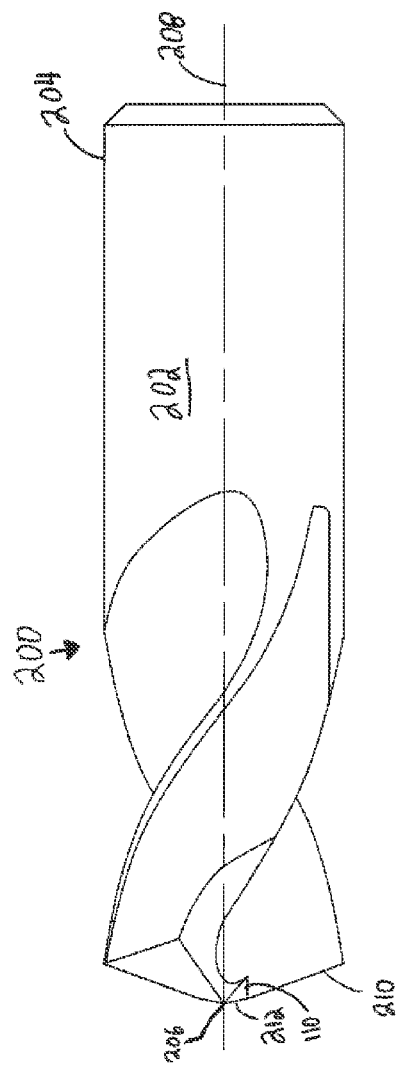

The present disclosure is not limited to the particular details of the apparatus depicted, and other modifications and applications may be contemplated. Further changes may be made in the apparatus, device, or methods without departing from the true spirit and scope of the disclosure herein involved. It is intended, therefore, that the subject matter in this disclosure should be interpreted as illustrative, not in a limiting sense.

As shown in FIGS. 1a and 1b, in an exemplary embodiment of the present disclosure, a cutting insert 100 includes a pair of cutting webs 102 that are inclined relative to one another. A cutting portion 104 of each cutting web 102 includes an outer cutting edge 106 and an inner cutting edge 108. The cutting portions 104 are transversely opposed to each other. Each cutting portion 104 includes a notch 110 which has a first face 112 and a second face 114 that meet at a joiner line 116 (also referred to as a valley). The first face 112, the second face 114, and/or the valley 116 may include curvature so that when the inner cutting edge 108 is cutting a material, the cut material can traverse down the first face 112, then through the joiner line 116, and curl up along the second face 114. In an embodiment, the first face 112 abuts the inner cutting edge 108 which is formed by a sinusoidal curve. In an alternative embodiment, the inner cutting edge is described one by one of the following curves: an involute curve; a cycloid curve; a trochoid curve; or a curve based on the Archimedean spiral. These curves are discussed in greater detail below in reference to FIG. 5. In an embodiment, the second face 114 is described by a radial curve. In another embodiment, the valley 116 is described by a radial curve. In an embodiment, the second face 114 and the valley 116 are described by curves of different radii. In an embodiment, the joiner line 116 has no width and is merely the intersection between the first face 112 and the second face 114. In an alternative embodiment, the valley 116 has a defined width and forms a separate face between the first face 112 and the second face 114.

In an embodiment, the cutting portions 104 are substantially symmetrical to one another.

As shown, in an embodiment, the notch 110 is formed with a smaller radius at the bottom of the notch 110 along the second face 114 than along the first face 112 (which is adjacent to the inner cutting edge 108). The rake angle, or the angle of a cutting tool with respect to the cutting direction, determines the ease or efficiency with which a cutting edge bites into or cuts a material. Using conventional designs, the rake angle formed along the cutting portion 104 is positive or neutral, preventing the cutting portion 104 from efficiently cutting through a workpiece and causing the workpiece to be deformed rather than cut. In contrast, the design of the notch 110 creates a positive rake along the inner cutting edge 104 of the notch 110, which cuts a workpiece efficiently, forming one or more chips and causes the inner cutting edge 108 to bite into a workpiece aggressively. This reduces the friction between the cutting insert 100, thereby also reducing the amount of heat created during use and assisting in prolonging the life of the cutting insert 100. Similarly, the outer cutting edge 106 may be formed so as to have a positive rake angle, thereby increasing the efficiency of the cutting insert.

A chisel 118 of the cutting insert 100 is defined by convergence of the cutting web 102 and the notch 110 to a point region 118a. Each cutting web 102 may include a first web surface 120 and a second web surface 122 that are connected by a web line 124. The first web surface 120 and the second web surface 122 are inclined relative to each other such that the web line 124 defines a peak relative to the first web surface 120 and the second web surface 122. The web surfaces 120 and 124 converge to the point region 118a to form a part of the chisel 118. Accordingly, the chisel 118 is formed by the first web surface 120 and the second web surface 122 of each cutting web 12, and first face 112, the second face 114 and the joinder line 116 of the notch 110.

The outer cutting edges 106 are also referred to as the primary cutting lips, while the inner cutting edges 106 are also referred to as the secondary cutting lips.

In an embodiment, the cutting insert 100 includes a pair of openings 126 configured to enable the insert to be secured to a cutting tool (not shown). In an embodiment, the cutting insert 100 is configured to be held within a front end of a cylindrical drill body, while the rear end of the drill body is secured to the remainder of the cutting tool or drilling machine. The cutting insert 100 may be secured, for example, in a slot in the drill body using the pair of openings 126.

In an embodiment, the cutting insert 100 has a diameter D. In an embodiment, the inner cutting edge 110 has a length from the point region to the transition point 128 that is less than half of the diameter D. In an embodiment, the inner cutting edge 110 has a length that is 0.49 times the diameter D.

In an embodiment, the curve on the inner cutting edge 110 may be defined by the expression $y=\sin(2*\pi*\pi x+\pi)$, with x describing an x coordinate on an x axis, y describing a y coordinate on a y axis that is perpendicular to the x axis, the point (0,0) defined as center of the point region 206, and the point (1,0) defined as the transition point 128 between the inner cutting edge 110 and the outer cutting edge 108. In an embodiment, the slope of the inner cutting edge 110 is equivalent to the slope of the outer cutting edge at the transition point 128. In other words, the inner cutting edge 110 smoothly joins the outer cutting edge 108 without any discontinuity. In an embodiment, the amplitude of the inner cutting edge 110 may be no more than 0.5 millimeters. In an embodiment, the amplitude of the inner cutting edge 110 is 0.5 millimeters.

Figure 2A:
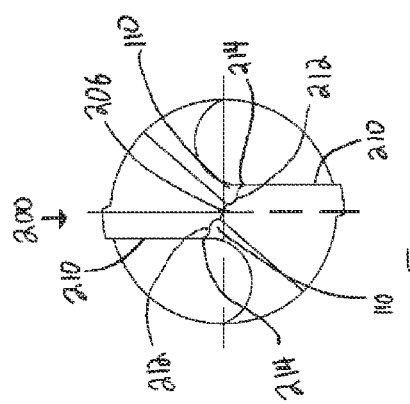
FIG. 2a is a top elevation view of a cutting tool in accordance with an embodiment of the present disclosure.

As shown in FIGS. 2a and 2b, in an exemplary embodiment of the present disclosure, a cutting tool 200 includes a substantially cylindrical main body 202 having a rear portion 204 at one end and a point region 206 at an opposite end. The rear portion 204 is configured to be held by a drilling machine while the point region is configured to cut a workpiece.

The cutting tool 200 is similar in many respects to the cutting insert 100. Accordingly, the same parts are referred to herein with the same reference numbers or terms. The cutting tool 200 is configured to rotate about a longitudinal axis 208 which runs through the shank portion 204 and the point region 206. The cutting tool 200 includes an outer cutting edge 210 and an inner cutting edge 212. As with the cutting insert 100 of FIG. 1, the outer cutting edge 210 and the inner cutting edge 212 may be formed so as to have a positive rake angle, for example through the use of a notch 110 adjacent to the inner cutting edge 212.

Figure 3A:
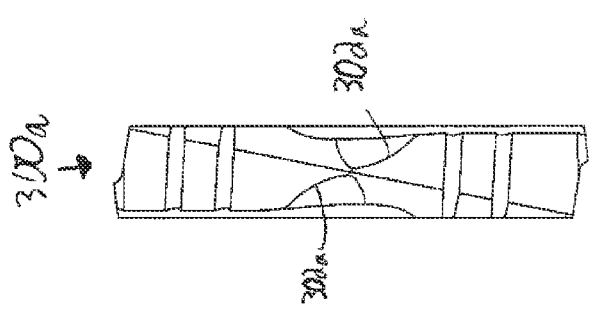
FIG. 3a is a top elevation view of a cutting insert featuring a gradual constant-radius curve on the secondary cutting lips.
Figure 3B:
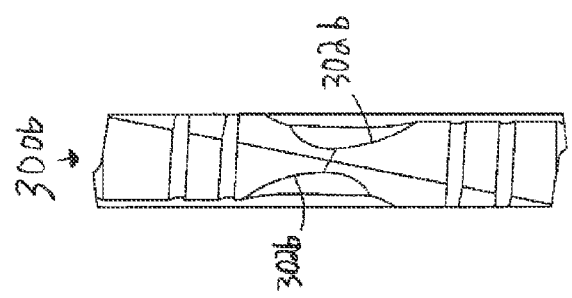
FIG. 3b is a top elevation view of a cutting insert featuring a sharp constant-radius curve on the secondary cutting lips.
Figure 3C:
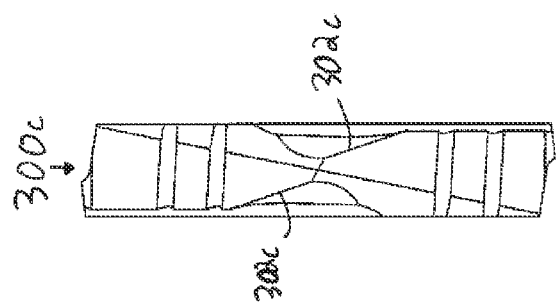
FIG. 3c is a top elevation view of a cutting insert featuring linear secondary cutting lips.
Figure 3D:
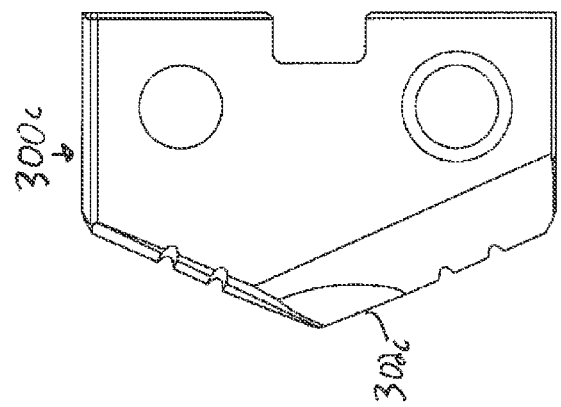
FIG. 3d is a side elevation view of the cutting insert of FIG. 3c.

Conventionally, the secondary cutting lips of a cutting insert are made in the form of either substantially straight lines or curves of a constant radius. Referring to FIGS. 3a-3d, cutting inserts in accordance with embodiments of the present disclosure are depicted with conventional curves applied to the secondary cutting lips. As shown in FIG. 3a, a cutting insert 300a may feature secondary cutting lips 302a with a sharp constant-radius curve. Alternatively, as shown in FIG. 3b, a cutting insert 300b may feature secondary cutting lips 302b with a gradual constant-radius curve. As shown in FIG. 300c, a cutting insert 300c may instead feature secondary cutting lips 302c that are substantially linear (e.g., are straight without significant curvature). FIG. 3d depicts a side elevation view of a cutting insert 300c with linear secondary cutting lips 302c.

Similarly, the secondary cutting lips of a conventional cutting tool are often made in the form of either substantially straight lines or curves of a constant radius. Referring to FIGS. 4a-4d, cutting tools in accordance with embodiments of the present disclosure are depicted with conventional curves applied to the secondary cutting lips. As shown in FIG. 4a, a cutting tool 400a may feature secondary cutting lips 402a with a constant-radius curve. Alternatively, as shown in FIG. 4b, a cutting tool 400b may feature secondary cutting lips 402b which are substantially linear (e.g., are straight without significant curvature). As shown in FIG. 4c, a cutting tool 400c may feature secondary cutting lips 402c which feature a constant convex radius. FIG. 4d depicts a side elevation view of a cutting tool 400b with linear secondary cutting lips 402b.

Figure 5:
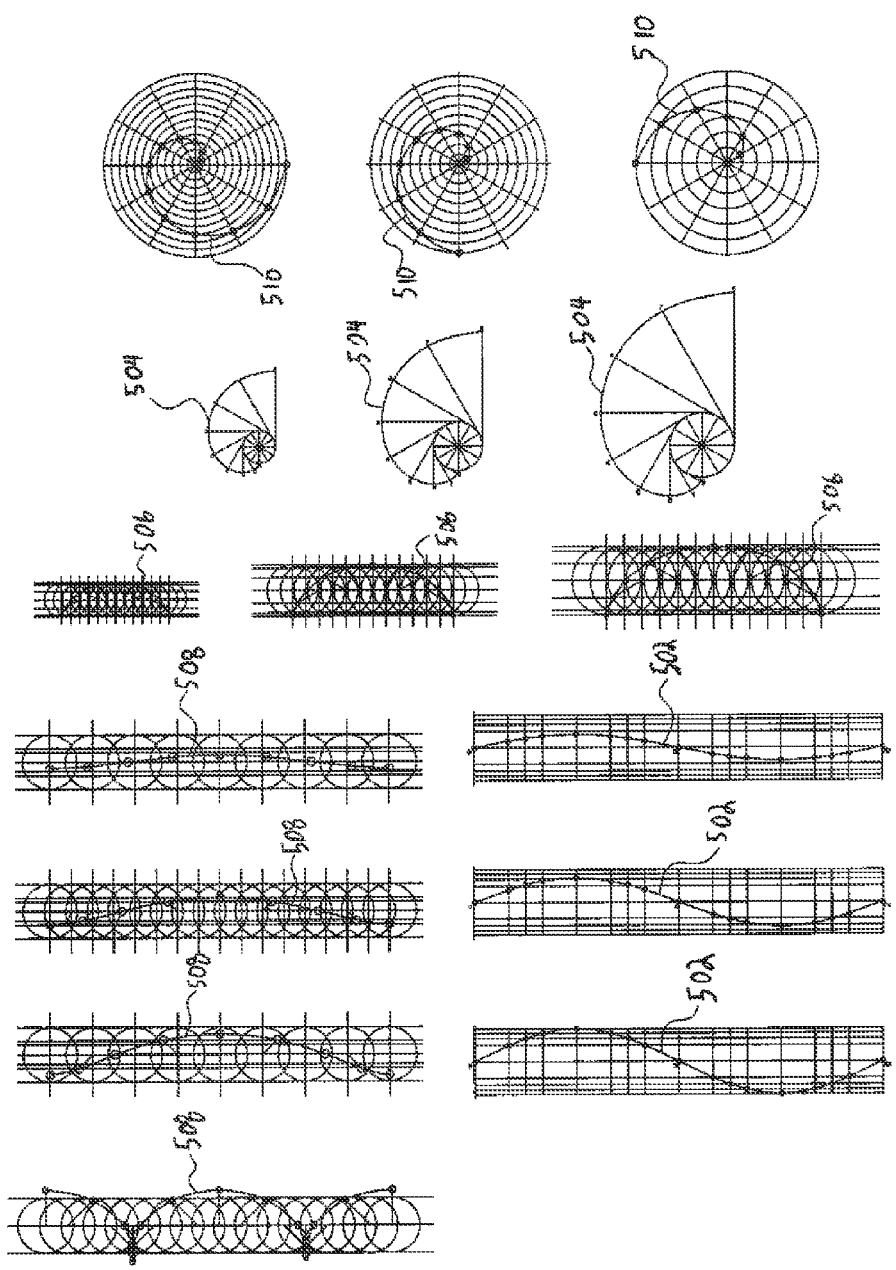
FIG. 5 depicts several types of curves that may be applied to a cutting edge.

Unlike curves used in conventional designs, referring to FIG. 5, in embodiments of the present disclosure, various types of curves may be applied to the inner cutting edge 108, 212 and the outer cutting edge 106, 210, including: sinusoid curves 502; involute curves 504; cycloid curves 506; trochoid curves 508; and curves based on the Archimedean spiral 510. As discussed in greater detail below, in a preferred embodiment, a sinusoidal curve is used for the secondary cutting lips on a cutting insert or cutting tool.

Referring to FIGS. 6a-6c and FIGS. 7a-7c, the different shapes of various curves applied to the secondary cutting lips of cutting inserts and cutting tools, respectively, are illustrated by overlays of the sinusoidal curve 602, 702 of a preferred embodiment with other types of curves.

Figure 6C:
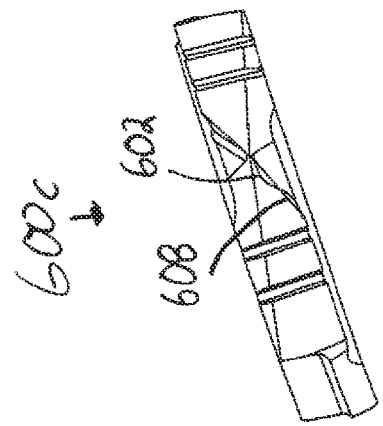
FIG. 6c depicts a cutting insert with a sinusoidal secondary cutting lip overlaid with a linear secondary cutting lip.
Figure 6B:
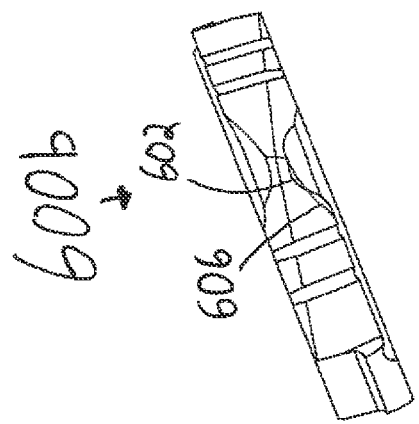
FIG. 6b depicts a cutting insert with a sinusoidal secondary cutting lip overlaid with a single-radius secondary cutting lip.
Figure 6A:
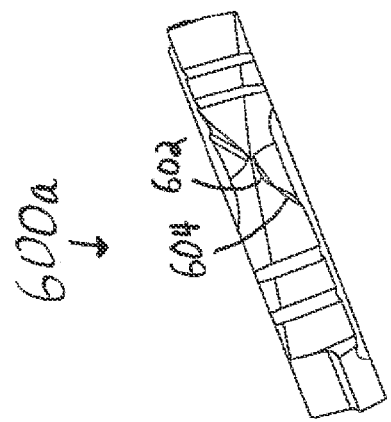
FIG. 6a depicts a cutting insert with a sinusoidal secondary cutting lip overlaid with a combined radii secondary cutting lip.

FIG. 6a depicts a sinusoidal secondary cutting lip 602 overlaid with a combined radii secondary cutting lip 604 on a cutting insert 602a. As shown, the combined radii secondary cutting lip 604 is formed by combining two curves together, wherein each curve is taken from the circumference of a circle with a different radius. In sharp contrast thereto, the sinusoidal secondary cutting lip 602 is described by a sinusoidal equation, such as $y=\sin(2*\pi*\pi+\pi)$. FIG. 6b depicts a sinusoidal secondary cutting lip 602 overlaid with a single-radius secondary cutting lip 606 on a cutting insert 602b. As shown, the single-radius secondary cutting lip 606 is formed by one curve taken from the circumference of a circle (e.g., a curve with a constant radius). FIG. 6c depicts a sinusoidal secondary cutting lip 602 overlaid with a linear secondary cutting lip 608 on a cutting insert 602c.

Figure 7C:
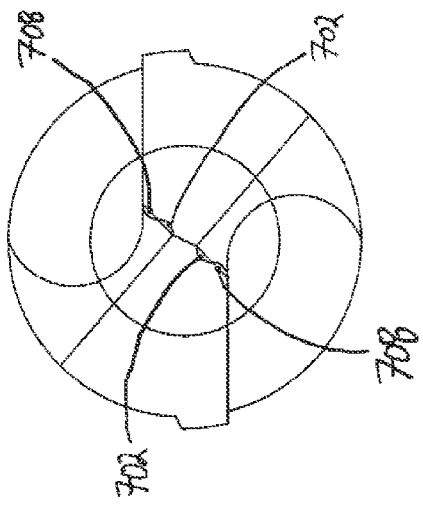
FIG. 7c depicts a cutting insert with a sinusoidal secondary cutting lip overlaid with a linear secondary cutting lip.
Figure 7B:
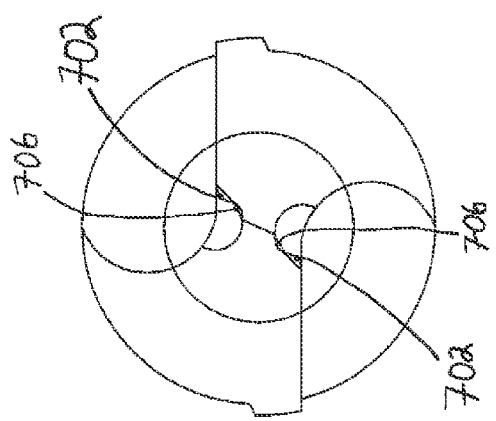
FIG. 7b depicts a cutting insert with a sinusoidal secondary cutting lip overlaid with a concave single-radius secondary cutting lip.
Figure 7A:
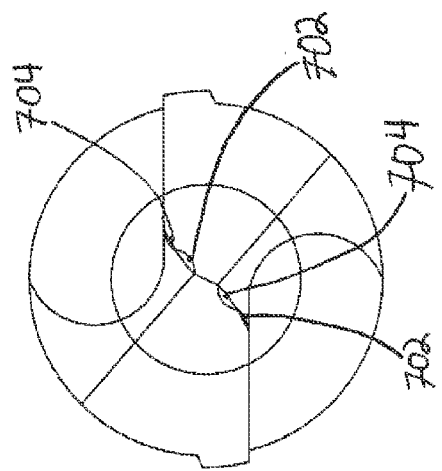
FIG. 7a depicts a cutting insert with a sinusoidal secondary cutting lip overlaid with a convex single-radius secondary cutting lip.

FIG. 7a depicts a sinusoidal secondary cutting lip 702 overlaid with a convex single-radius secondary cutting lip 704 on a cutting tool 702a. As shown, the convex radius secondary cutting lip 704 is formed by taking a portion of the circumference of a circle and placing it so as to form a convex curve. In sharp contrast thereto, the sinusoidal secondary cutting lip 702 is described by a sinusoidal equation, such as $y=\sin(2*\pi*\pi+n)$. FIG. 7b depicts a sinusoidal secondary cutting lip 702 overlaid with a single-radius secondary cutting lip 706 on a cutting tool 702b. As shown, the single-radius secondary cutting lip 706 is formed by one curve taken from the circumference of a circle (e.g., a curve with a constant radius), placed so as to form a concave curve. FIG. 7c depicts a sinusoidal secondary cutting lip 702 overlaid with a linear (also known as straight edge or split point) secondary cutting lip 708 on a cutting tool 702c.

Figure 8:
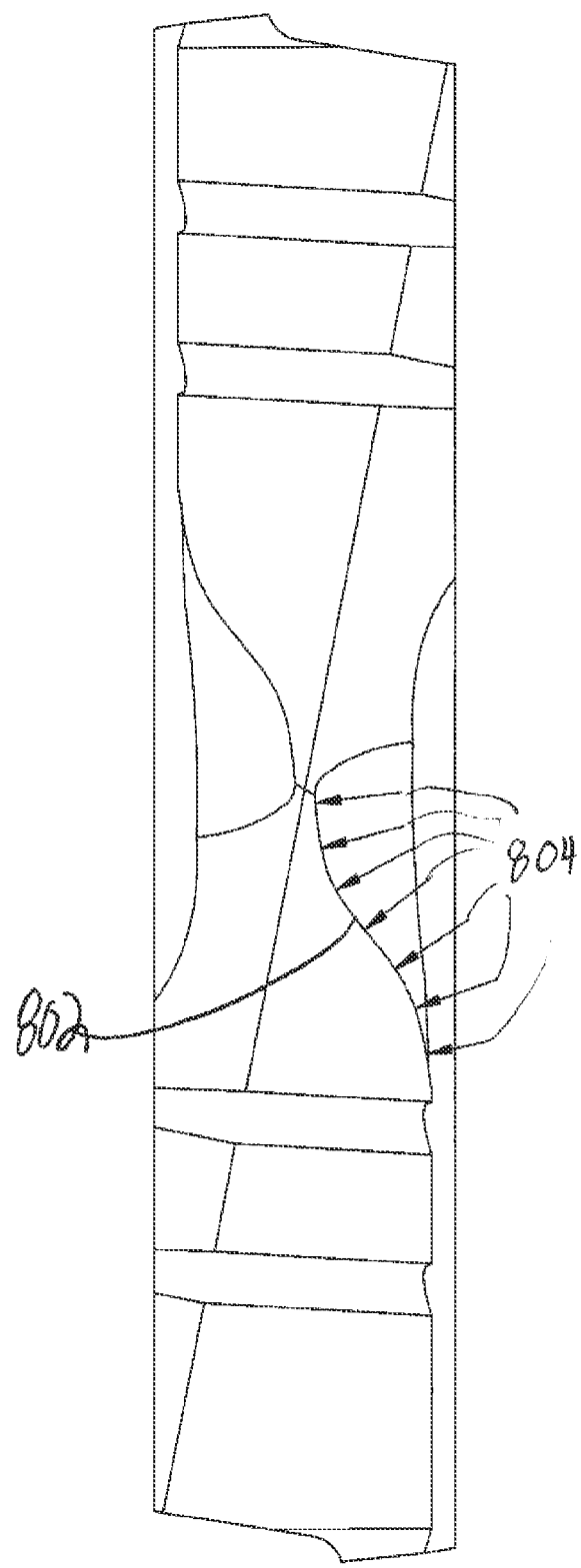
FIG. 8 is a top elevation view of a cutting insert in accordance with an embodiment of the present disclosure including lines illustrating the cutting force along a secondary cutting lip.

Multiple advantages exist to utilizing variable-radius curves generally, and sinusoidal curves in particular, for the secondary cutting lips. For example, applying a sinusoidal curve to the secondary cutting lips provides for smoother cutting. The cutting force is dispersed perpendicular to the secondary cutting lips at each point along the secondary cutting lips. For a conventional design employing straight or linear secondary cutting lips, the entirety of the cutting force is directed in the same direction. For a conventional design employing a single radius curve, the cutting force seemingly originates at the center point for the circle which would be formed by completing the radial curve. In contrast, with reference to FIG. 8, forming a secondary cutting lip 802 using a sinusoidal curve causes the applied cutting forces 804 (shown as arrows that are each perpendicular to the secondary cutting lip 802 at a different point) to be dispersed in different directions, dividing the force and enabling the secondary cutting lip to make smoother cuts.

Further, utilizing a sinusoidal curve for the secondary cutting lips causes material removed from a workpiece to be divided into smaller portions than those formed by secondary cutting lips using either straight or radial curves. In other words, the sinusoidal shape combined with the positive rake angle of the secondary cutting lips causes "chip splitting," which efficiently removes material from a workpiece with a minimal amount of friction or wasted energy in the form of heat.

Additionally, forming the secondary cutting lip 802 using a sinusoidal curve increases the overall length of the secondary cutting lips, as compared with conventional designs using a radial curve or a straight edge. Cutting edges wear faster when higher forces (termed cutting loads) are applied along the cutting edge. By lengthening the cutting edge, the cutting load experienced at each point along the cutting edge is reduced for a given cut, thereby lengthening the service life of the cutting edge.

As an added benefit, the use of a sinusoidal curve for the secondary cutting lips enables the secondary cutting lips to smoothly join the primary cutting lips. With reference again to FIGS. 4a-4d, conventional designs result in abrupt discontinuities at the transition point 406 between the secondary cutting lips 402 and the primary cutting lips 404. These discontinuities cause the transition points to extrude away from the primary cutting lips 404 and secondary cutting lips 402 and as a result the transition points 406 experience significantly greater force than any other point on the cutting lips, causing significantly increased wear over time and leading to the degradation of both the secondary cutting lips 402 and the primary cutting lips 404 as the transition point 406 wears down. In sharp contrast thereto, as shown in FIG. 2a, the transition point 214 between the secondary cutting lips 212 and the primary cutting lips 210 is smooth when the secondary cutting lips 212 are shaped as a sinusoidal curve. This eliminates the increased wear at the transition point 214, as the transition point experiences the same or similar amount of force as the remainder of the cutting lips.

These advantages are supported by testing comparing conventional designs featuring straight and radial curves to the presently disclosed sinusoidal curve for the secondary cutting lips. In repeated experiments cutting metal using all three designs, the sinusoidal curve exhibited significantly less wear after drilling 100 holes than either the straight line or multiple radius designs.

One of skill in the art will recognize that all the various components identified in this disclosure may be made from any material or combination of materials suitable for the expected structural load and environment for drilling and cutting including, without limitation, metals, composites, engineered plastics, natural or synthetic materials, etc. Furthermore, such components may be formed in any conventional manner, such as by molding, casting, machining, cold or hot forming, forging, etc. Still further, such components may be finished in any conventional manner, such as painting, powder coating, plating, etc., or may be unfinished.

Furthermore, while the particular preferred embodiments have been shown and described, it is obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective, based on the related art.

What is claimed is:

1. A drill insert comprising:
   a pair of cutting webs inclined relative to each other; and
   a pair of opposed cutting portions, each cutting portion partially defining a side portion of a corresponding cutting web, each cutting portion comprising:
   an outer cutting edge; and
   an inner cutting edge connected to the outer cutting edge at a transition point;
   wherein the inner cutting edge of each cutting portion converge at a point region and each inner cutting edge is sinusoidal in shape as described by $y=\sin(2*\pi*x+\pi)$, with x describing an x coordinate on an x axis, y describing a y coordinate on a y axis that is perpendicular to the x axis, the point (0,0) defined as the point region, and the point (1,0) defined as the transition point.

2. The drill insert of claim 1, wherein the drill insert has a diameter, each inner cutting edge has an inner cutting edge length that stretches from the point region to the transition point, and the inner cutting edge length is 0.49 times the diameter.

3. The drill insert of claim 1, wherein the sinusoidal shape of each inner cutting edge has an amplitude of no more than 0.5 millimeters.

4. The drill insert of claim 1, wherein each outer cutting edge has an outer slope at the transition point, each inner cutting edge has an inner slope at the transition point, and the outer slope is equivalent to the inner slope.

5. The drill insert of claim 1, wherein each inner cutting edge has a positive rake.

6. The drill insert of claim 1, wherein each outer cutting edge has a positive rake.

7. A drilling tool assembly comprising:
   a drill body having a rotational axis running longitudinally through a forward end and a rear end, wherein the rear end is configured to be secured to a drilling machine and the forward end comprises a slot; and
   the drill insert of claim 1 disposed in the slot.

* * * * *